United States Patent [19]

Hooper

[11] Patent Number: 4,465,106
[45] Date of Patent: Aug. 14, 1984

[54] WARM DAMPER FOR A SUPERCONDUCTING ROTOR

[75] Inventor: George D. Hooper, Murrysville, Pa.

[73] Assignee: Electric Power Research Institute, Inc., Palo Alto, Calif.

[21] Appl. No.: 350,527

[22] Filed: Feb. 19, 1982

[51] Int. Cl.³ .............................................. F16L 9/14
[52] U.S. Cl. .................................... 138/142; 138/143; 138/172; 138/109; 29/523
[58] Field of Search ............... 138/143, 141, 140, 142, 138/133, 138, 172, 109; 29/523; 228/108, 126, 132; 174/47

[56] References Cited

U.S. PATENT DOCUMENTS

| | | | |
|---|---|---|---|
| 3,584,657 | 6/1971 | Dorr et al. | 138/143 X |
| 4,039,870 | 8/1977 | Sterrett | 310/52 |
| 4,123,676 | 10/1978 | Cooper et al. | 310/52 |
| 4,152,609 | 5/1979 | Cooper et al. | 310/52 |
| 4,383,556 | 5/1983 | Evgenievich et al. | 138/143 X |

FOREIGN PATENT DOCUMENTS

| | | |
|---|---|---|
| 2636180 | 2/1978 | Fed. Rep. of Germany . |
| 394366 | 11/1965 | Switzerland . |
| 140811 | 10/1920 | United Kingdom . |
| 1580920 | 12/1980 | United Kingdom . |

*Primary Examiner*—James E. Bryant, III
*Attorney, Agent, or Firm*—William D. Lanyi

[57] ABSTRACT

A warm damper for a superconducting rotor is described which uses a laminar assembly of a conductive tube and a plurality of support tubes. The conductive tube is soldered to axially adjacent support tubes and the resulting composite tube is explosively welded to two or more support tubes disposed adjacent to its radially inner and outer surfaces.

8 Claims, 3 Drawing Figures

WARM DAMPER FOR A SUPERCONDUCTING ROTOR

BACKGROUND AND SUMMARY OF THE INVENTION

The present invention relates to the rotor of a superconducting generator and, more particularly, to the construction and method for making a warm damper for a supercooled rotor.

Superconducting generators typically utilize supercooled rotor field windings which conduct a direct current through its coils. This direct current experiences essentially no resistance due to its supercooled state and significant reductions of power loss can thus be achieved.

In order to maintain stability, however, amplitude variations in this direct current must be avoided. Possible causes of these variations include transient faults which can subject the rotor windings to time-varying magnetic fields.

The coils of a superconducting rotor's winding can be shielded from these time-varying magnetic fields by interposing a damper between them and the source of these magnetic fields, namely the generator's stator winding. This damper, referred to herein as a warm damper because it is not itself supercooled, is a tubularly shaped construction disposed around the rotor's winding. It comprises a conductive cylinder which is capable of absorbing externally caused magnetic fields. Although pure copper does not have the required mechanical strength for this application, this conductive central cylinder can be made of a higher strength zirconium-copper alloy although other suitable high strength and conductivity materials, such as chromium-copper, can be used as a viable substitute. The magnetic field is absorbed by the central cylinder as the field's strength is dissipated by the creation of eddy currents within the central cylinder.

This magnetic field dissipation produces potentially significant forces within the central shield which could possibly cause severe distortions within it. Therefore, some means for rigidly supporting the central cylinder is required. A high strength superalloy material can be used to provide support on the central cylinder's radially inside and outside surfaces. Superalloys are iron, cobalt or nickel based alloys that contain chromiumm for resistance to oxidation and hot corrosion and that contain other elements for strength at elevated temperatures. It should be understood that any material which has a yield strength in excess of 130,000 psi and has sufficient elongation properties to be suitable for use in a superconducting rotor application, such as Inconel 706 or Inconel 718, is within the scope of the present invention and can be used as an alternative for the superalloy discussed herein. This construction, effectively, a superalloy-copper-superalloy laminar assembly and is capable of providing sufficient mechanical strength for the central cylinder under supercooled conditions. However, it presents manufacturing problems if the laminar assembly is to be attached with other components located at its axial ends.

The construction described above results in the assembly having axial surfaces which comprise three concentric rings of dissimilar materials, namely Inconel-copper-Inconel in the above example. These surfaces are not suitable for maintaining a bolted connection to other components since the central cylinder of copper does not have the mechanical strength to withstand the forces associated with a generator rotor. In contradistinction, axial surfaces which are totally constructed of an Inconel alloy would provide sufficient strength to maintain a bolted connection to another rotor component which is disposed axially adjacent to the above described assembly.

The present invention provides a composite assembly which has a central cylinder of a high strength copper alloy which is completely encased in shell made of a high strength material capable of retaining its properties at cryogenic temperatures or any suitable superalloy, resulting in axial surfaces which have no copper portion. A warm damper made in accordance with the present invention comprises a central conductive cylinder which has a high strength cylinder made from a superalloy and bonded, by soldering or brazing, to each of its ends in an aligned coaxial relation. These three cylinders each have a central bore therethrough and each have essentially identical inside and outside diametric dimensions. This composite assembly is then disposed between an inner and an outer high strength superalloy cylinder in concentric and coaxial relation. The composite cylinder is then bonded to the inner and outer cylinder along their adjacent circumferential surfaces. The composite, inner and outer cylinders are bonded together by explosive welding.

The combination of soldering, or brazing, and explosive welding provides a sufficient metallurgical bonding between all adjacent surfaces of the warm damper. This bonding has the required strength to withstand the stresses associated with a generator rotor and permits the warm damper to be constructed in a way that results in its cylindrical shape having two axial surfaces which can readily be bolted to other rotor components.

DESCRIPTION OF THE PREFERRED EMBODIMENT

The present invention relates to superconducting generator rotors and, more specifically, to the construction of a warm damper for application therein.

Figure 1:
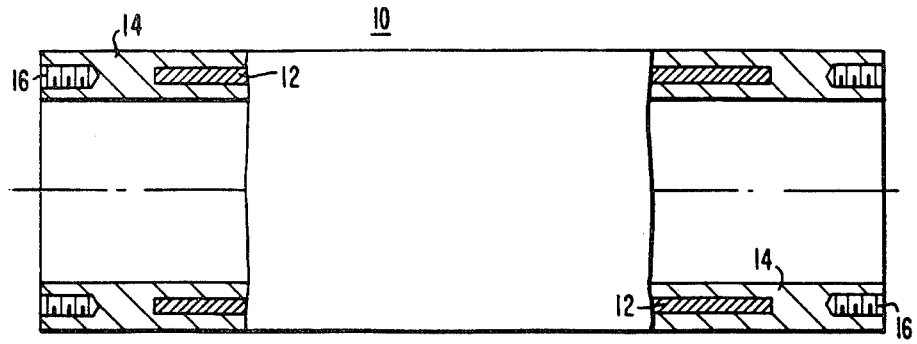
FIG. 1 depicts an exemplary warm damper showing the required axial end configuration for bolting to adjacent components.

FIG. 1 illustrates an exemplary warm damper 10 for use in a superconducting rotor. The warm damper 10 is constructed to be assembled around the superconducting windings of a supercooled rotor and to shield the coils of these windings from externally propagated time-varying magnetic fields.

The essential components of a warm damper 10 are shown in FIG. 1. They include a conductive central tube 12 and a generally rigid support structure 14. The conductive tube 12 absorbs time-varying magnetic fields and dissipates their energy by conducting eddy currents, induced by the fields, within its structure. The conductive tube 12, which is generally made of a high strength copper alloy such as zirconium-copper, does not, however, have sufficient mechanical strength to withstand the potentially crushing forces associated with this energy dissipation function. Therefore, a higher strength, generally rigid, structure such as the support tube 14 is used to provide this mechanical support.

It should be apparent, however, that a configuration as shown in FIG. 1 must be fabricated from individual components in order to result in a construction in which a central tube 12 is encased within a support structure 14 as illustrated. A further complication arises when the structure must also be axially boltable to other rotor components as shown by the threaded axial holes 16. It should be further apparent that these holes 16 should not extend through an interface region of two dissimilar materials and should not extend into a material such as the above-mentioned copper alloy because of its inferior mechanical strength properties.

Figure 2:
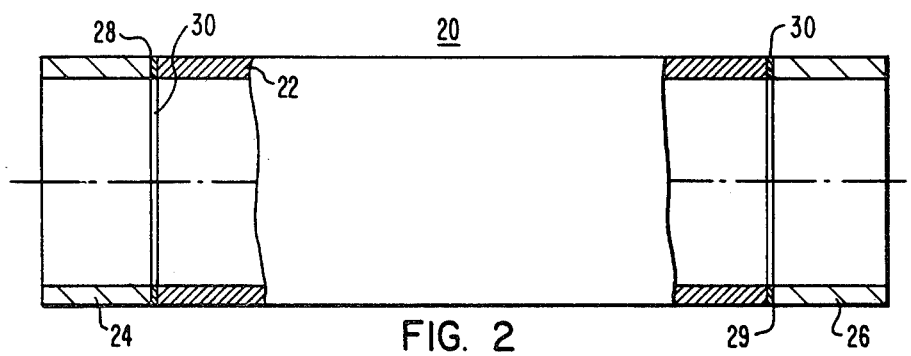
FIG. 2 illustrates the central composite tube of the present invention.

Although the support structure 14, which can typically be made from a superalloy has sufficient mechanical strength under cryogenic conditions to provide a bolted connection as illustrated by the threaded holes 16, the problem of providing this boltable axial end must be solved in a way which makes the overall warm damper 10 manufacturable. The present invention utilizes a central composite tube 20 as shown in FIG. 2. It comprises a conductive tube 22 which is bonded to two tubes, 24 and 26, which are made of a high strength superalloy. These two axially outboard tubes 24 and 26 are metallurgically bonded to the axial ends of the conductive tube 22, which can be a copper alloy, such as zirconium-copper or chromium-copper. It has been found that soldering is preferable to brazing in making these bonds since brazing temperatures are generally above that which degrades the properties of copper. However, it should be understood that, whenever lower temperature brazing is possible, brazing is an acceptable alternative and, in either case, when used in conjunction with prior nickel plating of the surfaces to be bonded, provides a suitable metallurgical bond within the scope of the present invention. It should be further understood that the conductive tube 22, itself, can be formed from more than one tube bonded together in coaxial association.

Figure 3:
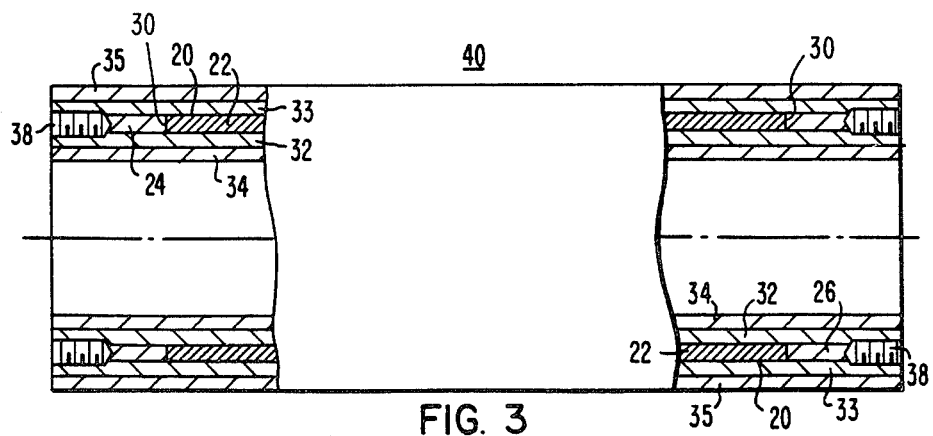
FIG. 3 shows the configuration of the present invention which utilizes the composite tube of FIG. 2 to achieve the desired axial end construction shown in FIG. 1.

The composite tube 20 of FIG. 2 is bonded together with its three constituent parts aligned in coaxial relation as shown in FIG. 2 and with a metallurgical bond at the interfaces, 28 and 29, between tubes 22 and 24 and between tubes 22 and 26, respectively. Although the solder or brazing material is very thin in actual practice, it is illustrated in exaggerated form in FIG. 2 for purposes of more clearly describing the present invention and is indicated by reference numeral 30. In FIG. 3, this layer 30 is not so exaggerated.

When the composite tube 20 is completed, it is further assembled to inner 32 and an outer 33 tubes made of a high strength material, such as a superalloy, as shown in FIG. 3. These support tubes, 32 and 33, are metallurgically bonded to the inside and outside surfaces of the composite tube 20 by explosive welding the components together.

It should be apparent that, where thick support tubes are required, multiple sequential explosive welding operations may be needed since a practical limit of approximately five-eighths of an inch exists on the thickness of tubing which is conducive to proper bonding by the explosive welding process. Therefore, as shown in FIG. 3, multiple tubes can be sequentially explosively welded to build up a desired thickness.

In FIG. 3, it can be seen that tubes 34 and 35 have been bonded to tubes 32 and 33, respectively to result in a thicker support structure of Inconel around the central conductive tube 22. The warm damper 40 shown in FIG. 3 and made in accordance with the present invention therefore has a central conductive tube 22, or cylinder, which is metallurgically bonded to two axially outboard tubes 24 and 26 to form a composite tube 20. A very thin layer of bonding material would be present between tubes 24, 22 and 26 as indicated by reference numeral 30. Inner 32 and outer 33 support tubes are then bonded to its surfaces to form a generally rigid structure with added thickness being provided by tubes 34 and 35 when and if required.

In FIG. 3, the central tube 22 is made of a conductive material such as zirconium-copper and all support tubes (reference numerals 24, 26, 32, 33, 34 and 35) are made of a high strength metal, such as a superalloy. This construction provides a generally rigid warm damper with ends suitable for bolting to other rotor components by providing threaded holes 38 and its axial ends. The central tube 22 is soldered to its axially adjacent tubes 24 and 26 and all other adjacent members are explosively welded together. The soldering or brazing of the central conductive tube 22 to its axially adjacent superalloy tubes provides sufficient strength to prevent these components from separating during the explosive welding operation and to eliminate potential cracking in this region which would be inducive to higher stresses and potential failures in this area.

It should be apparent that the present invention provides a warm damper assembly which is generally rigid and which provides a means for bolting the warm damper to other rotor components. It should further be apparent that, although the present invention has been described with specific reference to soldering and explosive welding techniques, other suitable metallurgical bonding methods are within its scope. Furthermore, it should be understood that although superalloys have been described in the preferred embodiment, other materials which can maintain a high strength at cryogenic temperatures are suitable within the scope of the present invention.

What I claim is:

1. A damper assembly, comprising:
   a first cylinder having a first and a second end, said first cylinder having a central bore therethrough, said first cylinder being electrically conductive;
   a second cylinder, said second cylinder having a central bore therethrough, said second cylinder being bonded to said first end of said first cylinder, said second cylinder being aligned coaxially with said first cylinder;
   a third cylinder, said third cylinder having a central bore therethrough, said third cylinder being bonded to said second end of said first cylinder, said third cylinder being aligned coaxially with said first cylinder;
   said first, second and third cylinders having generally identical inside and outside diameters;
   a fourth cylinder having a central bore therethrough, said fourth cylinder being disposed radially inward from and coaxially with said first, second and third cylinders, said fourth cylinder being bonded to said first, second and third cylinders;
   a fifth cylinder having a central bore therethrough, said fifth cylinder being disposed radially outward from and coaxially with said first, second and third cylinders, said fifth cylinder being bonded to said first, second and third cylinders;

said first cylinder being bonded to said second and third cylinders by solder;

said fourth cylinder being explosively welded to said first, second and third cylinders; and said fifth cylinder being explosively welded to said first, second and third cylinders.

2. The damper assembly of claim 1, wherein:
said first cylinder is made of a zirconium-copper alloy.

3. The damper assembly of claim 1, wherein:
said second, third, fourth and fifth cylinders are made of a superalloy.

4. A superconducting rotor, comprising:
a composite tube, said composite tube having a first tube with a first and a second end, said first end being bonded to a second tube, said second end being bonded to a third tube, said first, second and third tubes being aligned coaxially, said first, second and third tubes each having generally identical inside and outside diameters;

an outer tube being disposed radially outward from and coaxially with said composite tube, said outer tube being bonded to said composite tube; an inner tube being disposed radially inward from and coaxially with said composite tube, said inner tube being bonded to said composite tube;

said second tube being soldered to said first tube; and said third tube being soldered to said first tube 5. The rotor of claim 4, wherein:
said outer tube is explosively welded to said composite tube; and said inner tube is explosively welded to said composite tube.

6. The rotor of claim 4, wherein:
said first tube is made of a zirconium-copper alloy.

7. A generator rotor, comprising:
a central tube having a first and a second end, said first end being soldered to a first outboard tube, sid second end being soldered to a second outboard tube, said first and second outboard tubes being aligned coaxially with said central tube;

an outer tube disposed radially outward from and coaxially with said central tube and said first and second outboard tubes, said outer tube being explosively welded to said central tube and said first and second outboard tubes; and an inner tube disposed radially inward from and coaxially with said central tube and said first and second outboard tubes, said inner tube being explosively welded to said central tube and first and second outboard tubes.

8. The rotor of claim 7, wherein:
said central tube is made of a zirconium-copper alloy; and said first and second outboard tubes, said inner tube and said outer tube are made of a superalloy with high strength characteristics at cryogenic temperatures.

* * * * *